(12) United States Patent
Hsieh

(10) Patent No.: US 7,320,449 B2
(45) Date of Patent: Jan. 22, 2008

(54) ADJUSTABLE HOLDING DEVICE FOR A MUSICAL INSTRUMENT STAND

(75) Inventor: Wu-Hong Hsieh, Lu Chou (TW)

(73) Assignee: K.H.S. Musical Instrument Co., Ltd., Lu Chou, Taipei Hsien (TW)

( * ) Notice: Subject to any disclaimer, the term of this patent is extended or adjusted under 35 U.S.C. 154(b) by 19 days.

(21) Appl. No.: 11/364,109

(22) Filed: Feb. 27, 2006

(65) Prior Publication Data

US 2007/0200036 A1    Aug. 30, 2007

(51) Int. Cl.
*A47F 5/00*    (2006.01)

(52) U.S. Cl. .................................. 248/122.1; 248/176.3

(58) Field of Classification Search ............. 248/122.1, 248/121, 176.3; 84/421, 422.3, 453; 984/150, 984/154, 257
See application file for complete search history.

(56) References Cited

U.S. PATENT DOCUMENTS

| | | | | |
|---|---|---|---|---|
| 3,945,291 A * | 3/1976 | Zickos | .......................... | 84/421 |
| 4,337,684 A * | 7/1982 | Le Mert | ....................... | 84/421 |
| 5,684,258 A * | 11/1997 | Liao | ............................. | 84/421 |
| 6,093,878 A * | 7/2000 | Hoshino | ....................... | 84/421 |
| 6,274,797 B1 * | 8/2001 | Liao | ............................. | 84/421 |
| 7,005,568 B2 * | 2/2006 | Hsieh | ......................... | 84/422.1 |

* cited by examiner

*Primary Examiner*—Korie Chan
(74) *Attorney, Agent, or Firm*—James H. Walters

(57) ABSTRACT

A holding device for a musical instrument stand has a lower retainer, a turning retainer, an upper retainer, a pivotal pin, a first screw member and a second screw member, and provide a capability of adjustable in length and at angle and retractable to the musical instrument stand.

1 Claim, 6 Drawing Sheets

ADJUSTABLE HOLDING DEVICE FOR A MUSICAL INSTRUMENT STAND

BACKGROUND OF THE INVENTION

1. Field of the Invention

The present invention relates to a holding device, and particularly relates to an adjustable holding device for a musical instrument stand device and that can provide a retractable and adjustable in length and at angle capability to the stand.

2. Description of the Related Art

A conventional musical instrument stand substantially comprises an extension shaft and a main shaft, and the extension shaft is retractably inserted into the main shaft. The extension shaft can be pulled out from the main shaft to adjust the length of the stand and is held in place with a bolt to fit different needs of users.

Some musical instruments, such as cymbals need a stand with an inclined bar for holding the musical instruments to allow a user to conveniently strike the musical instruments. A conventional stand with an inclined bar is implemented with a holder having teeth, so the inclined bar can be held in place relative to the stand. However, the inclined bar cannot be folded relative to the stand, such that a large space is needed for storing or transporting the conventional stand with an inclined bar.

Therefore, the invention provides an adjustable holding device for a musical instrument stand to mitigate or obviate the aforementioned problems.

SUMMARY OF THE INVENTION

The main objective of the present invention is to provide a holding device for a musical instrument stand device to provide a capability of retractable and adjustable to the musical instrument stand. The holding device in accordance with the present invention has a lower retainer, a turning retainer, an upper retainer, a pivotal pin, a first screw member and a second screw member.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
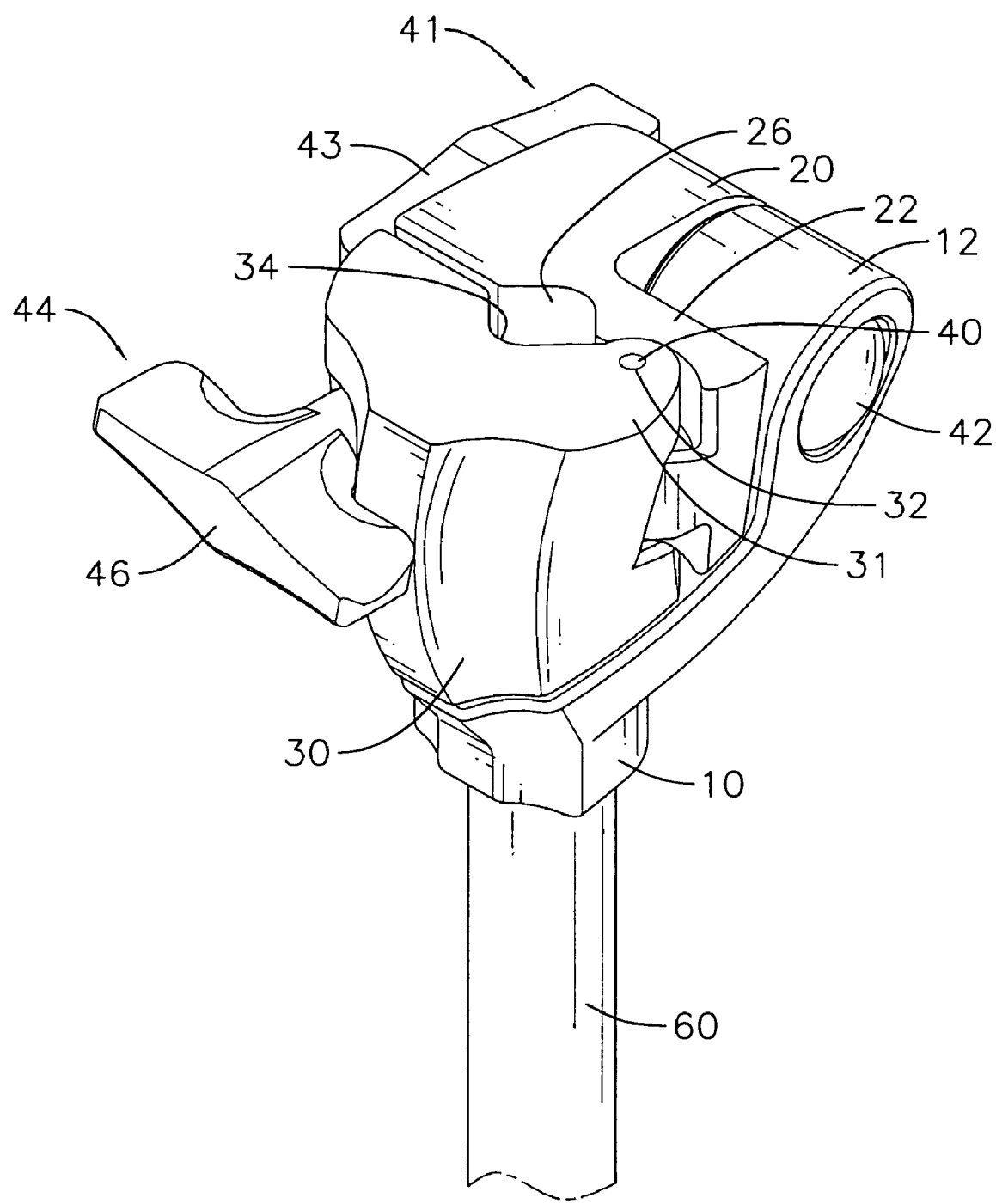
FIG. 1 is a perspective view of a holding device for a musical instrument stand device in accordance with this invention.
Figure 2:
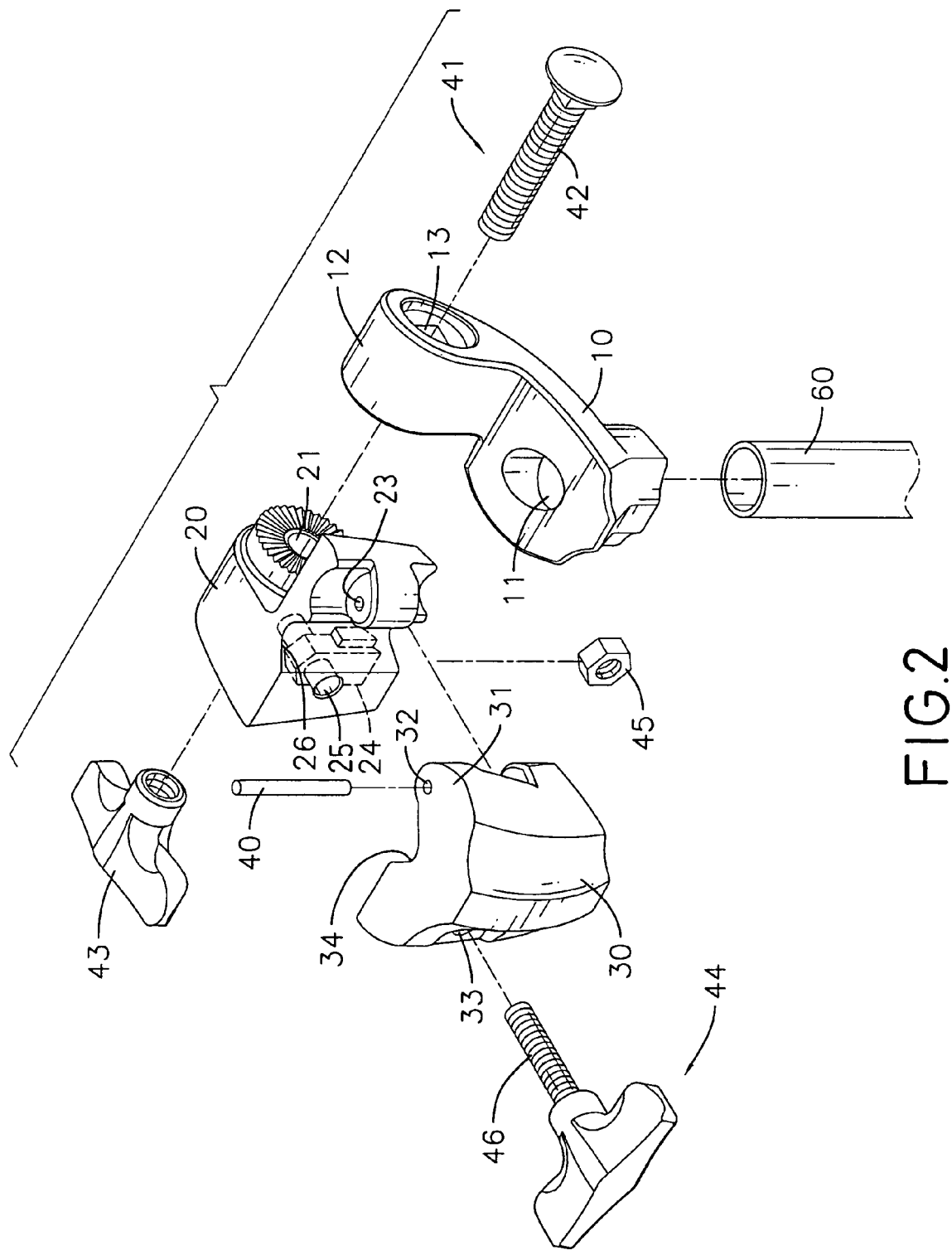
FIG. 2 is an exploded view of the holding device in FIG. 1.
Figure 3:
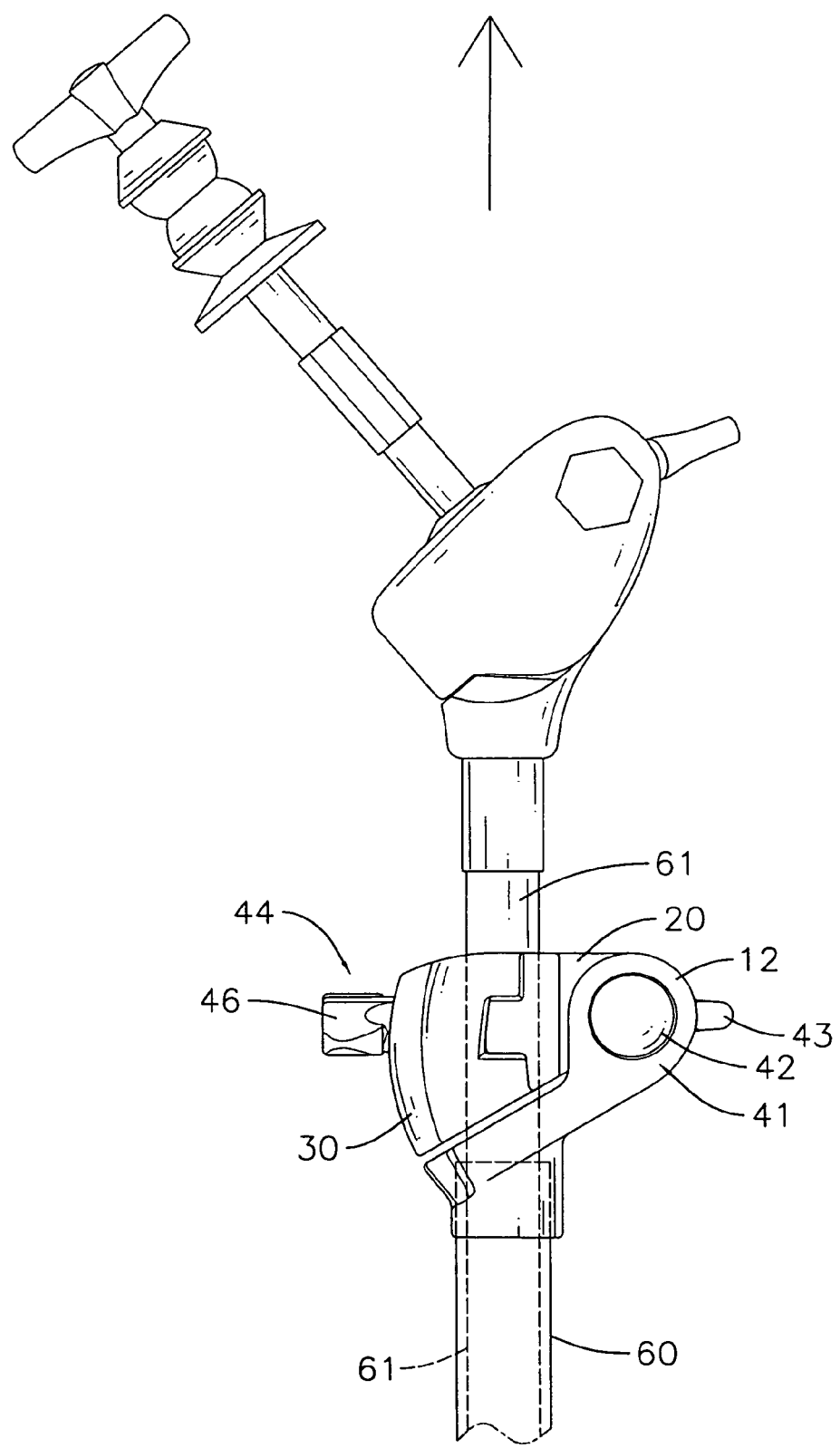
FIG. 3 is an operational side view of the holding device in FIG. 1 showing that the musical instrument stand device is adjusted in height.

With reference to FIG. 1 to 3, a holding device for a musical instrument stand device in accordance with the present invention has a lower retainer (10), a turning retainer (20), an upper retainer (30), a pivotal pin (40), a first screw member (41) and a second screw member (44) to provide a capability of being adjustable in length and at angle and retractable to the stand.

The lower retainer (10) has a connection hole (11) defined through the lower retainer (10) to connect a tube (60) of the musical instrument stand to the lower retainer (10) with the connection hole (11). A pivotal base (12) is extended from one side of the lower retainer (10) and has a half width of the lower retainer (10) and a first pivotal hole (13) defined laterally through the pivotal base (12).

The turning retainer (20) is pivotally mounted on the lower retainer (10) and has a half width of the lower retainer (10) and a second pivotal hole (21) defined laterally through the turning retainer (20) and aligning with the first pivotal hole (13). A first connection member (22) is extended from one side of the turning retainer (20), toward the pivotal member (12), and has a first aperture (23) defined through the first connection member (22). A bottom hole (24) is defined in a bottom of the turning retainer (20), and a first through hole (25) is defined in a face of the turning retainer (20) and communicates with the bottom hole (24). A first channel (26) is defined in the turning retainer (20) at the face in which the first through hole is defined.

The upper retainer (30) is mounted on the lower retainer (10), is pivotally connected to the turning retainer (20), and has a same width as the lower retainer (10). A second connection member (31) is extended from one side of the upper retainer (30) toward the turning retainer (20) and has a second aperture (32) defined through the second connection member (31). A second channel (34) is defined in one side of the upper retainer (40) and is aligned with the channel (26) in the turning retainer (20). A second though hole (33) is defined through the upper retainer (30) and is aligned with the first though hole (25) in the turning retainer (20).

The pivotal pin (40) is mounted though the first aperture (23) and the second aperture (32) to pivotally connect the upper retainer (30) to the turning retainer (20).

The first screw member (41) is comprised of a first screw (41) and a first nut (43). The first screw (41) is mounted though the first pivotal hole (13) and the second pivotal hole (21), and then is engaged with the first nut (43).

The second screw member (44) is comprised of a second screw (46) and a second nut (45). The second screw member (44) is mounted though the second though hole (33) and the first though hole (25) and is engaged with the second nut (45).

To assembly the holding device, the upper retainer (30) is pivotally mounted on the turning retainer (20) by the pivotal pin (40).

The upper retainer (30) and the turning retainer (20) are combined together with the second screw member (46).

The turning retainer (20) is pivotally mounted on the lower retainer (10) with the first screw member (41).

Figure 4:
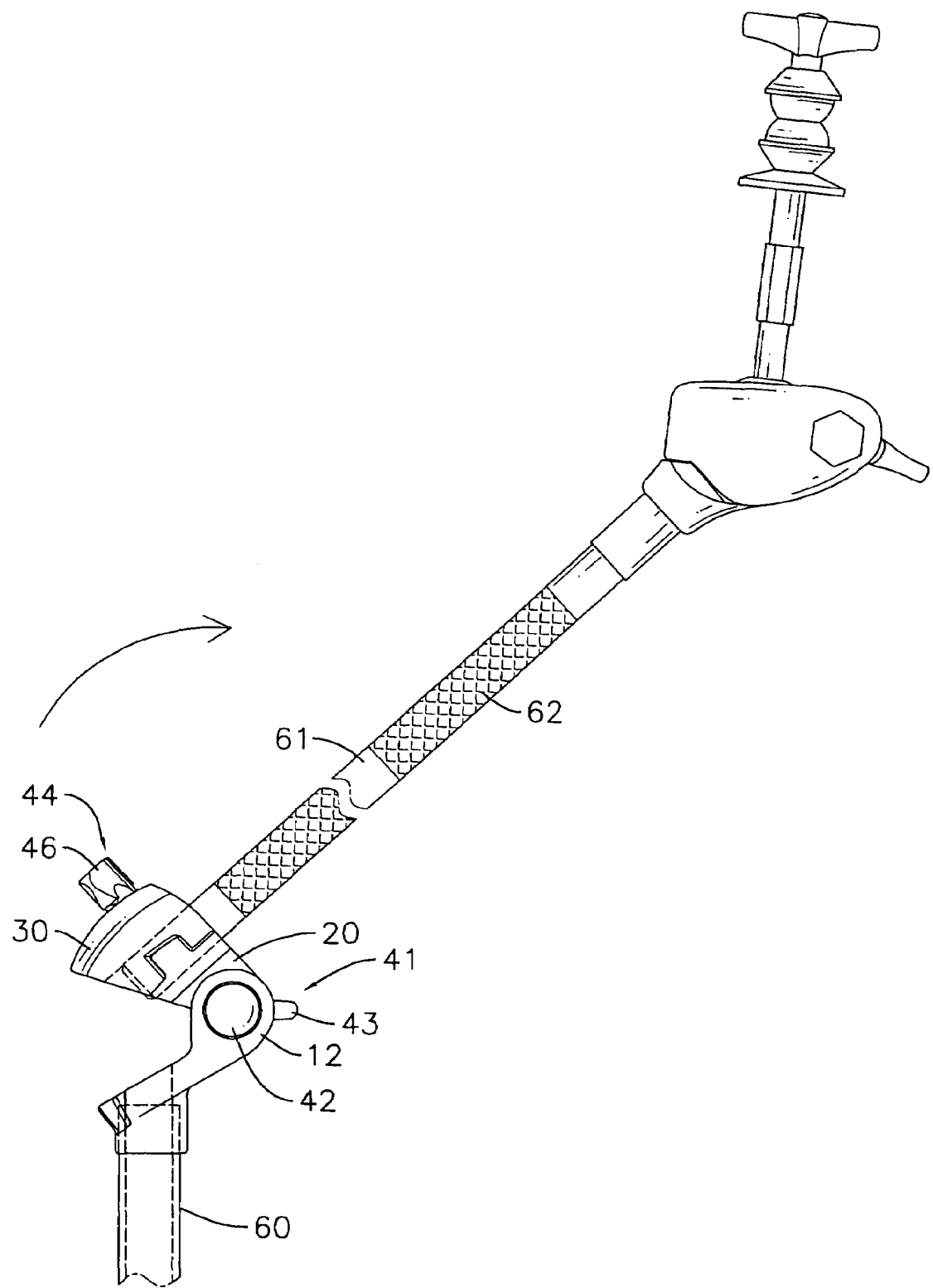
FIG. 4 is an operational side view of the holding device in FIG. 1 showing that the angel of the musical instrument stand device is adjusted.
Figure 5:
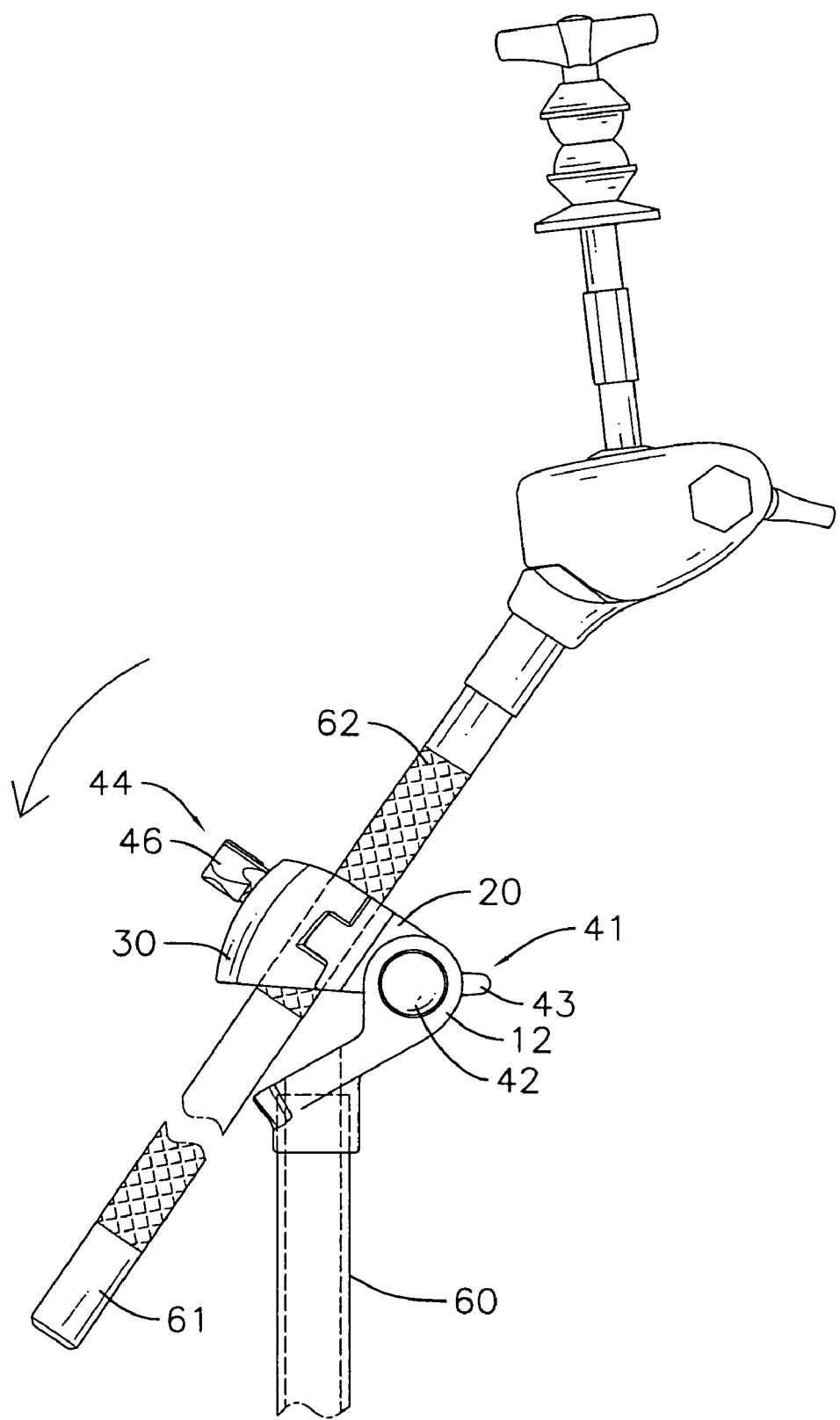
FIG. 5 is another operational side view of the holding device in FIG. 1 showing that the angel of the musical instrument stand device is adjusted.
Figure 6:
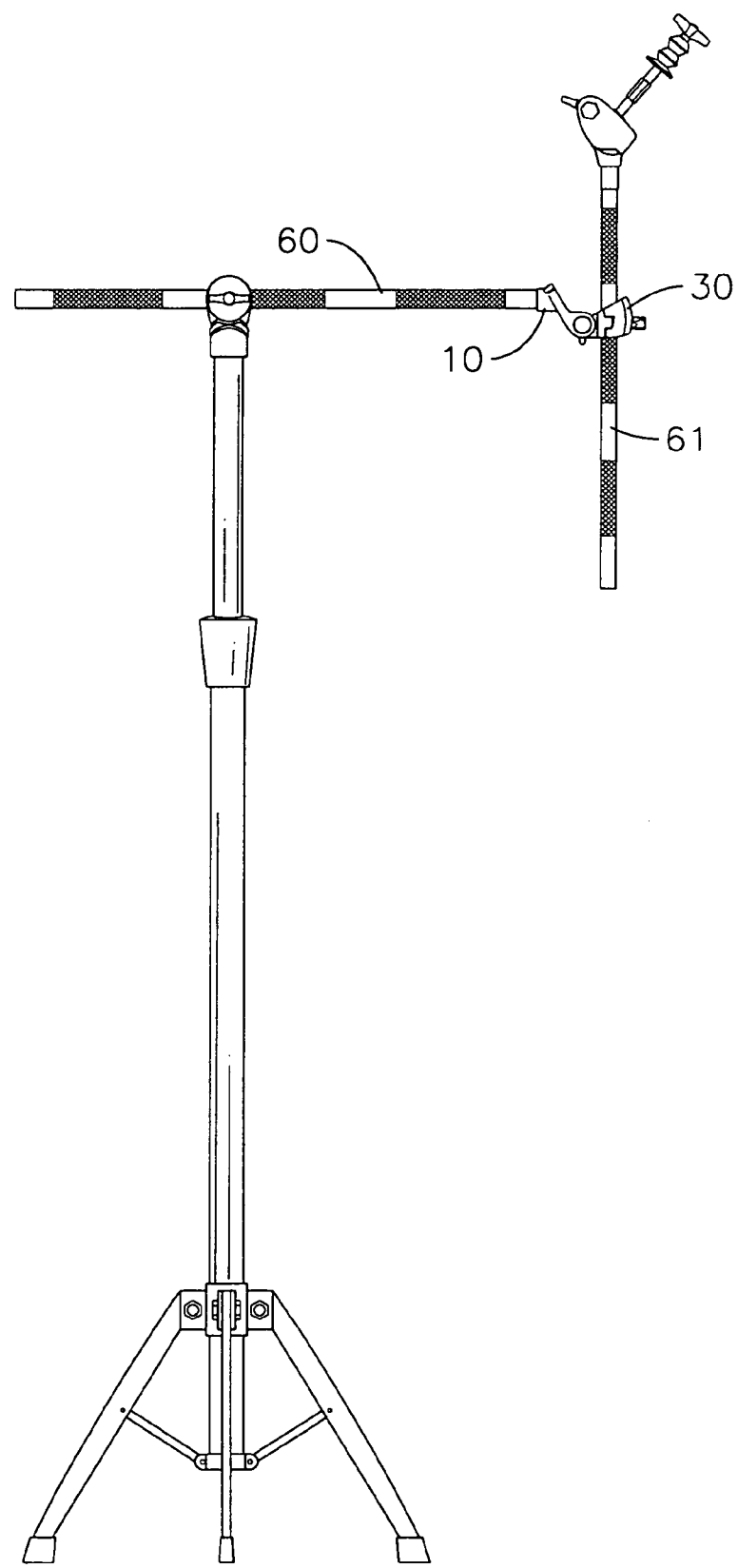
FIG. 6 is a side view of a musical instrument stand device with the holding device in FIG. 1.

With reference to FIGS. 4 to 6, the holding device is mounted between an upright bar (60) and an inclined bar (62) of a musical instrument stand. The upright bar (60) is inserted into the connection hole (11) of the lower retainer (10), and the inclined bar (62) is compressed between the first and second channels (26,34) in the turning retainer (20) and the upper retainer (30).

When the second screw (44) is loosened, the combination between the turning retainer (20) and the upper retainer (30) is released to allow the inclined bar (62) to be moved along the first and second channels (26,34). Accordingly, the position of the inclined bar (62) relative to the upper bar (60) can be adjusted. When the first screw member (41) is loosened, the turning retainer (20) with the upper retainer (30) can be pivoted relative to the lower retainer (10). Consequently, the angle between the inclined bar (62) and the upper bar (60) can be adjusted.

With reference to FIG. 3, when the first and second screw members (41), (44) are loosened, the inclined bar (62) can be inserted into the upright bar (60) though the connection hole (11). Accordingly, the space for storing the whole musical instrument stand is reduced.

In addition, multiple annular slots are defined in a periphery wall of the inclined bar (62) to increase the friction to the channels (26,34).

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A holding device for a musical instrument stand comprising a lower retainer, a turning retainer pivotally mounted on the lower retainer, and an upper retainer pivotally mounted with the turning retainer, wherein the lower retainer has a connection hole defined through the lower retainer, a pivotal member being extended from one side of the lower retainer and having a half width of the lower retainer and a first pivotal hole defined laterally through the pivotal member;

the turning retainer has a half width of the upper retainer and a second pivotal hole defined laterally through the turning retainer, a first connection member is extended from one side of the turning retainer toward the pivotal member and has a first aperture defined through the first connection member, a bottom hole is defined in a bottom of the turning retainer, a first through hole is defined in a face of the turning retainer and communicates with the bottom hole, and a first channel is formed in the turning retainer at the face in which the first through hole is defined;

the upper retainer has a second connection member extended from one side of the upper retainer toward the turning retainer and a second aperture defined through the upper retainer and aligning with the first aperture in the turning retainer, a second channel is formed in the upper retainer and aligns with the first channel, and a second though hole is defined laterally through the upper retainer and aligns with the first though hole;

a pivotal pin is mounted though the first aperture and a second aperture to pivotally connect the upper retainer to the turning retainer;

a first screw member is comprised of a first screw and a first nut, and the first screw is mounted though the first pivotal hole and the second pivotal hole and is engaged with the first nut; and a second screw member is comprised of a second screw and a second nut, and the second screw member is mounted though the second though hole and the first though hole and is engaged with the second nut.

* * * * *